Aug. 5, 1924.
E. R. CARPENTER
1,504,097
FIRELESS COOKER
Filed March 31, 1923
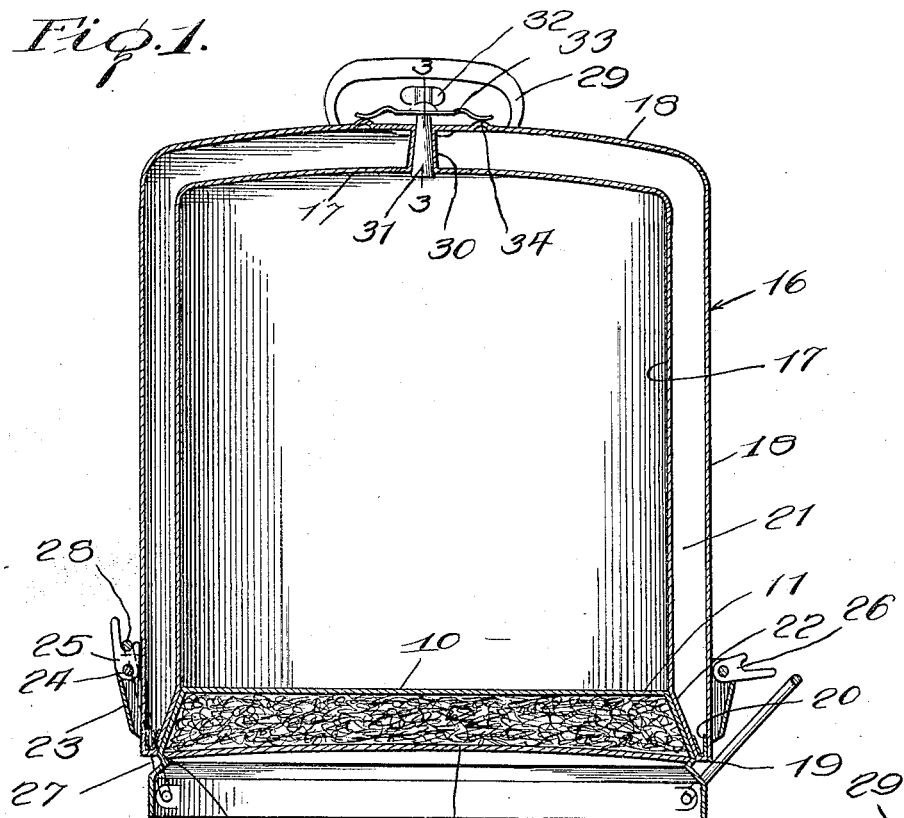
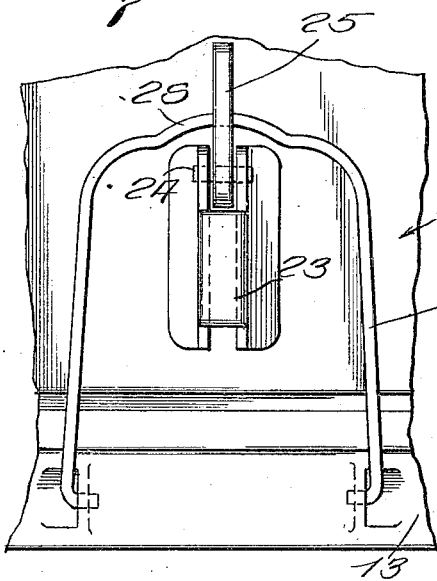
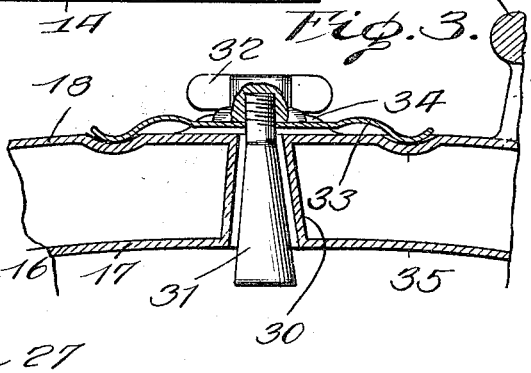
Inventor
Eugene R. Carpenter
By Watson E. Coleman
Attorney Patented Aug. 5, 1924.

1,504,097

UNITED STATES PATENT OFFICE.

EUGENE ROY CARPENTER, OF ANSONVILLE, NORTH CAROLINA.

FIRELESS COOKER.

Application filed March 31, 1923. Serial No. 629,204.

*To all whom it may concern:*

Be it known that I, EUGENE R. CARPENTER, a citizen of the United States, residing at Ansonville, in the county of Anson and State of North Carolina, have invented certain new and useful Improvements in Fireless Cookers, of which the following is a specification, reference being had to the accompanying drawings.

This invention relates to cooking utensils, and particularly to fireless cookers.

One of the objects of this invention is to provide a fireless cooker comprising a base and a cooker adapted to fit over the base and have air-tight engagement therewith, the cover being formed with inner and outer walls to provide a vacuum space and the base being filled with non-conducting material, the joint between the cover and the base being at the lower margin of the cover so that the heat will be less likely to escape through the joint between the cover and base.

A further object is to provide a construction of this character in which the base is formed with a downwardly and outwardly beveled peripheral face while the lower margin of the cover is formed with a downwardly and outwardly beveled inner face which has wedging and air-tight engagement with the peripheral face of the base to thereby secure an absolutely tight fit between the cover and the base.

A still further object is to provide means for detachably connecting the cover to the base including spring fastening members which act as a safety valve so that in case any excess of pressure is generated within the cooker the pressure will act to lift the cover of the cooker and permit the relief of the pressure.

Another object is to provide a vapor relief valve preferably located in the cover and having means whereby it may be manually opened or manually closed, the relief valve being so constructed that it is resiliently urged to its closed position, the vapor relief valve being adapted to be opened a few minutes before the food is removed from the cooker, thus giving a chance for the excess moisture present within the cooker to escape.

Other objects have to do with the details of construction and arrangement of parts as will appear more fully hereinafter.

My invention is illustrated in the accompanying drawings, wherein:—

Figure 1 is a vertical diametrical sectional view through a fireless cooker constructed in accordance with my invention;

Figure 2 is a fragmentary elevation of the lower portion of the cover of the fireless cooker and the base therefor;

Figure 3 is an enlarged sectional view on the line 3—3 of Figure 1 but showing the valve opened.

Referring to the drawings, the base of the cooker is formed of sheet metal brazed or otherwise made to provide a central flat portion 10 with downwardly and outwardly extending flanges 11. The flange extends downward and outward for a certain distance, then inward to form a bead 12, and then downward and outward and then straight downward, as at 13. This portion 13 is adapted to support the base. Resting upon the bead 12 is an upwardly concave disk 14 and the space between this disk or plate 14 and the central portion 10 is to be filled with asbestos 15 or with any other suitable heat insulating material. The asbestos may be placed upon the face of the plate 10 and then the plate 14 forced into place beyond the bead 12.

Coacting with the base is a cover, designated generally 16, which cover is cylindrical in cross section and has an inner wall 17 and an outer wall 18, these walls being made of sheet metal. The inner wall and the outer wall are connected at the lower edge of the cover by a welded joint 19, and disposed within this welded joint is a strengthening web 20 U-shaped in cross section and forming part of the welded joint. The space 21 between the outer and inner walls is to be exhausted of air. The inner wall 17 at its lower margin is downwardly and outwardly extended, as at 22, to fit against the downwardly and outwardly extending face of the flange 11 and have an air-tight engagement against this flange so that the more firmly the cover is pressed down upon the base, the tighter will be the joint between the cover and the base.

For the purpose of holding the cover to the base, I provide at diametrically opposite points on the cover the brackets 23. These brackets are approximately U-shaped in cross section and may be welded to the outer wall 18 adjacent the lower margin thereof and extending through each bracket is a pivot pin 24. Pivotally mounted upon the pivot pin is an approximately L-shaped latch 25 having a seat 26. Pivotally mounted upon the base and preferably on the straight portion 13 are the U-shaped bails 27. The middle portion of each bail is upwardly bowed, as at 28. When the latch 25 is turned upward to the position shown in Figure 1, it will be obvious that the cover will be drawn downward against the base but that the projecting end of the latch 25 may be readily shifted downward by the fingers to release the corresponding bail. These bails 27 are resilient so that the cover is resiliently urged downward against the base and if any excess pressure is generated within the cooker the pressure will act to lift the cover against the action of the spring, the pressure will be relieved, and then the spring will act to draw the cover immediately downward in tight contact with the base. The cover at its center is provided with a handle 29 and this cover at one side of its center is formed to provide a passage 30, this passage being upwardly tapering.

Disposed within the passage and adapted to normally bear against this upwardly tapering seat formed by the passage is a valve 31, the upper end of which carries a head 32 preferably having screw-threaded engagement with the valve. Brazed to this head 32 is a bowed leaf spring 33 which at its ends normally rests upon two bosses 34. When the ends of the springs rest upon these bosses, the valve 31 will be resiliently drawn upward against its seat in the passage 30. When, however, the valve is turned by the head 32 so that the spring 33 is carried off of the bosses 34 and into diametrically opposite depressions 35 arranged on a line at right angles to the bosses, then the valve will be lowered slightly enough to permit any vapor which may have gathered within the cooker to escape.

It will be seen that my construction provides a fireless cooker which has a relatively small outside diameter, which is light in weight, which is thoroughly sanitary, there being no uneven surface to catch dirt, and every part being easily accessible for scrubbing. By providing the inverted cover resting upon a flat base, it will be seen that articles to be cooked may be readily placed upon the base in dishes or the like and then the cover placed upon the base instead of the article having to be lowered into the aperture of a fireless cooker, as is usually the case. Because of the fact that the joint between the cover and the base comes at the peripheral edge of the base, it is obvious that the heat will not be so likely to escape as it would if the joint were at the upper end of the cooker, for the reason that heat has a tendency to rise and will be retained in the upper portion of an inverted bowl-shaped body so that even if the joint for any reason between the base and the cover is not air-tight yet the heat will not escape from the cooker as it would if the joint were at the upper portion of the cooker.

As before remarked, the spring fasteners not only hold the cover closely down upon the base but provide for relief of pressure in case the pressure becomes too great within the cooker and permit the escape of steam.

The vapor relief valve is particularly useful after the food has been cooked. By opening this valve for a few minutes before the food is removed from the cooker, the excess moisture is taken out of the food, giving it a much better flavor than it would otherwise have. The cooker can be used for any purpose for which a fireless cooker is used and is particularly advantageous in browning the food.

It will be obvious that an electric heating device might be applied to the base for the purpose of heating the contents of the cooker if it be desired. Inasmuch as this is an obvious thing and heating devices of this character have been used before with fireless cookers, I do not deem it necessary to describe it.

While I have illustrated a construction which I have found to be thoroughly effective for the purpose intended, I do not wish to be limited thereto, as it is obvious that many changes might be made with regard to the details of construction and arrangement of parts and to the design of the cooker without departing from the spirit of the invention.

I claim:—

1. A fireless cooker having a base formed with a downwardly and outwardly inclined peripheral face, and a cover having a side wall, the inner face of the side wall at its lower margin being downwardly and outwardly inclined to fit the peripheral face of the base, and means for detachably engaging the cover with the base, said means being resilient to permit the cover to raise from the base.

2. A fireless cooker of the character described comprising a hollow base formed of sheet metal, the interior of the base being filled with non-heat-conductive material and the periphery of the base being downwardly and outwardly inclined, and a cover having a top and a side wall, the top and side walls being hollow and exhausted of air, the inside face of the side wall at the lower margin of the cover being downwardly and outwardly inclined to fit the peripheral face of the base, and means for detachably locking the cover closed against the base.

3. A fireless cooker of the character described comprising a base formed of sheet metal, the sheet metal being formed to provide a central flat portion, then downwardly and outwardly extended, then formed to provide a circumferential bead and then downwardly extended, a metal plate engaging the base just above the bead, the space between the plate and the central portion of the base being filled with non-conducting material, a cover having an outer and inner wall, the space between said walls being exhausted of air, the inner wall being downwardly and outwardly inclined at its lower end to fit the peripheral wall of the base, the outer and inner walls being joined at the lower end of the cover, and means for detachably locking the cover to the base, said means being resilient to permit the cover to lift from the base.

4. A fireless cooker comprising a base having a downwardly and outwardly inclined peripheral face, a cover having the inner face of its side wall downwardly and outwardly inclined to fit the base, and means for detachably holding the cover in place upon the base comprising latches pivoted at opposite points on the side wall of the cover, each latch having a seat upon its inner face, and yokes pivoted to the base and adapted to be engaged by said seat, the upward movement of the latches acting to draw the cover downward against the seat.

5. A fireless cooker comprising a base and a cover fitting thereon, the cover being formed at its top with a vapor passage, and an upwardly opening, manually operable valve resiliently urged to its seat in said passage and having a handle exterior of the top but manually shiftable downwardly to open the passage.

6. A fireless cooker having at its top an upwardly tapering passage, a tapering valve normally closing said passage, a spring urging the valve upward, the valve having a handle disposed exterior to the top whereby the valve may be manually pushed downward.

7. In a fireless cooker, a cover having an upwardly tapering passage, an upwardly tapering valve mounted in the passage, a leaf spring carried by the valve and extending in opposite directions, a head whereby the valve may be rotated, and oppositely disposed bosses with which the ends of the leaf spring are adapted to engage when the valve is rotated in one direction to thereby lift the valve to its closed position.

8. A fireless cooker comprising a base and a cover having a top and side walls fitting over the base, an escape passage extending through the top, an upwardly tapering valve disposed in said passage, a spring attached to the upper end of the valve and bearing against the upper face of the top, a head whereby the valve and spring may be rotated, oppositely disposed bosses with which the spring is adapted to engage to thereby yieldingly hold the valve to its seat, the top at diametrically opposite points and on a line at right angles to the bosses being provided with depressions to permit the spring to be relaxed and the valve opened.

In testimony whereof I hereunto affix my signature.

EUGENE ROY CARPENTER.